Jan. 2, 1940.  W. L. SULLIVAN  2,185,530
BLUE PRINT MACHINE AND VARIABLE SPEED TRANSMISSION THEREFOR
Filed Feb. 7, 1939
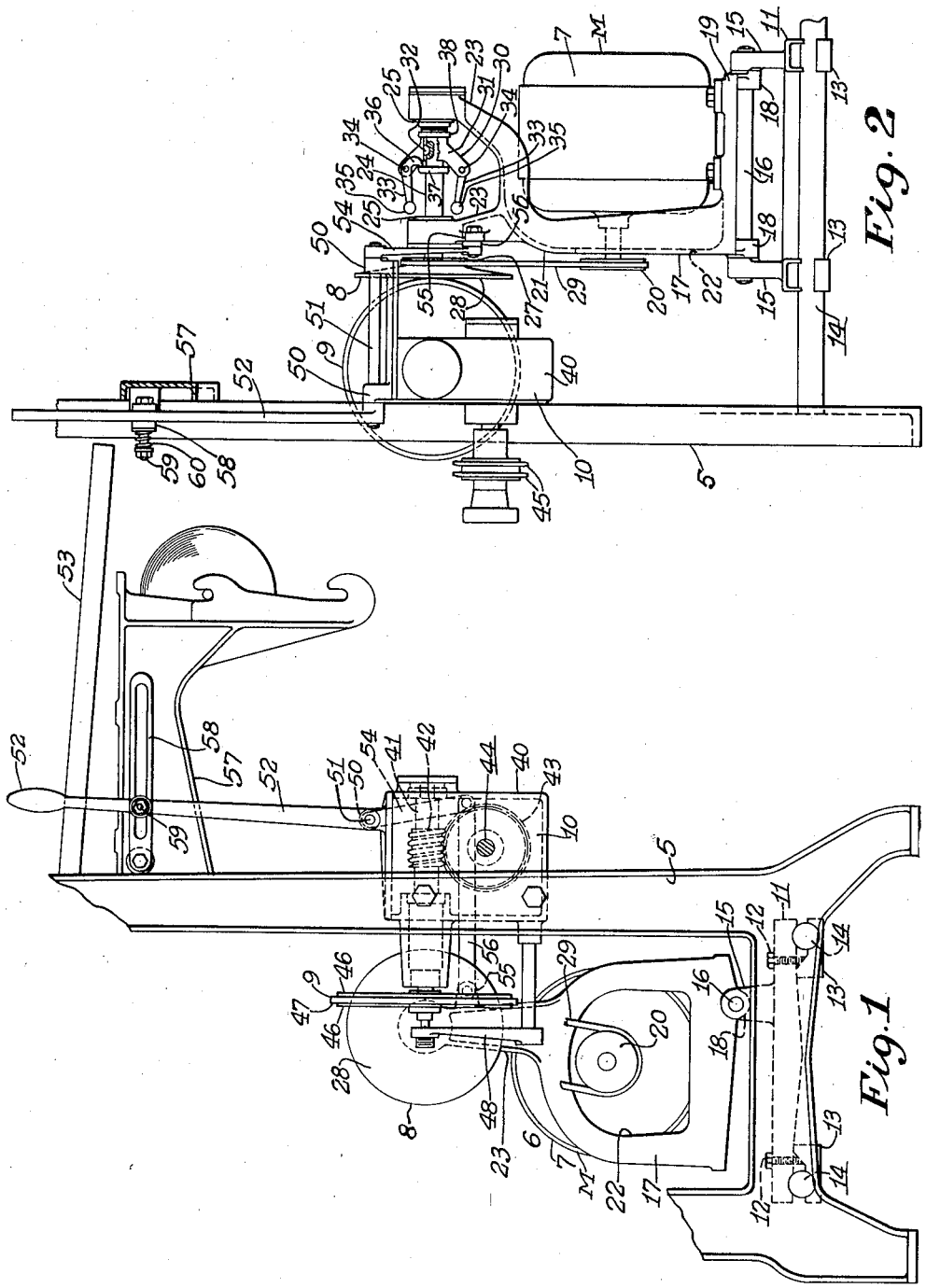
INVENTOR.
WARREN L. SULLIVAN
BY D. Clyde Jones
ATTORNEY.

Patented Jan. 2, 1940

2,185,530

UNITED STATES PATENT OFFICE 2,185,530

BLUE PRINT MACHINE AND VARIABLE SPEED TRANSMISSION THEREFOR

Warren L. Sullivan, Rochester, N. Y., assignor to Paragon Revolute Corporation, Rochester, N. Y., a corporation of New York Application February 7, 1939, Serial No. 255,109

6 Claims. (Cl. 74—197)

This invention relates to blue printing machines and particularly to governor-controlled variable-speed transmissions therefor.

In a combination blue print machine and drier it is essential to provide an adjustable friction device to drive the printer and to draw the blue print paper or the like through the drier at predetermined speeds. Such a friction device has included a driving disk having a flat face with which the periphery of the leather ring of a friction disk is held in contact under the action of a manually adjusted spring. The pressure between the driving disk and the leather ring of the friction disk was maintained even while the blue print machine was idle. As a result, when the machine stood idle for any length of time the constant pressure of the driving disk on the leather ring caused a flattening of the leather. The resulting flat spots in the ring necessitated frequent replacement or truing up of the same since the ring must be circular for efficient operation. Also it was difficult to adjust the speed at which the blue print machine was to operate, when the machine was idle, since the driving disk always pressed firmly against the friction disk. In copending application, Serial No. 173,819, filed November 10, 1937, there is disclosed a variable-speed transmission arrangement which insures proper pressure between the driving disk and the friction disk while the blue print machine is in operation, but which removes any harmful pressure between these parts when the apparatus is idle.

It is an object of the present invention to provide an improved variable-speed transmission arrangement including a driving unit and a driven unit, which may be readily adjusted to vary the speed and direction of rotation of the driven unit.

It is a further object of the present invention to provide an improved variable-speed transmission arrangement comprising a driven unit and a driving unit including a motor and a governor-controlled disk driven thereby, which are carried by a pivotally mounted support whereby the position of the driving disk relative to the disk of the driven unit can be readily adjusted for controlling the speed and direction of rotation of the driven unit.

It is another object of this invention to provide a variable-speed transmission unit particularly adapted for use with blue print machines of the type disclosed in applicant's copending application, Serial No. 124,874, filed February 9, 1937, whereby the speed of the drying unit and of the printing unit may be readily adjusted to meet varying conditions.

It is also an object of the invention to provide an improved variable-speed transmission in which the driving unit and the driven unit are each separately supported thereby providing simple assembly of the transmission and facilitating adjustment, repair and replacement of parts.

These and other objects of the invention will appear from the detailed description and claims when taken with the drawing in which—

Fig. 1 is a fragmentary side elevation of a blue print machine such as disclosed in copending application, Serial No. 124,874 and illustrating the variable-speed transmission of the present invention mounted thereon.

Fig. 2 is a front elevation of Fig. 1, particularly illustrating the construction of the driving unit of the variable-speed transmission.

Referring to the drawing, the numeral 5 indicates one of the end frames of the printer of a blue print machine, having attached the variable-speed transmission 6 to be hereinafter described in greater detail.

The variable-speed transmission 6 comprises a driving unit 7 including the driving disk 8 which frictionally engages the friction disk 9 of the driven unit 10 to rotate the same. As will appear hereinafter, the entire driving unit is pivotally mounted on the machine frame so that the driving disk 8 may be moved relative to the driven disk 9 to vary the speed and direction of rotation of the driven unit 10. The supporting means for the driving unit comprises a plate 11 secured by means of bolts 12 and clamp jaws 13 to a pair of transverse brace rods 14, which extend between the end frames 5 (only one of which is shown in the drawing). This plate 11 is provided with a pair of spaced, upwardly-extending apertured lugs 15 which support the rod 16 on which the driving unit frame 17 is pivotally mounted by means of the depending bearings 18, preferably formed integral with the motor base 19 of the frame 17. A motor M, having a V-pulley 20 fixed to the shaft thereof, is adjustably bolted to the motor base 19.

The driving unit frame 17 has an upwardly-extending driving shaft bracket 21 provided with an opening 22 through which the motor shaft and pulley 20 extend. This bracket terminates in spaced shaft-supporting arms 23. A driving shaft 24, supported for rotation in bearings 25 seated in the ends of the arms 23, projects beyond the bracket 21 and carries the driving disk 8 and V-pulley 27. This disk is preferably made of metal, one face thereof being flat as indicated at 28. The V-pulley 27, which may be formed integrally with the drive disk, is alined with the pulley 20 to receive the belt 29.

The driving unit also includes a governor 30 which serves to move the driving shaft 24 and its disk toward the left, as viewed in Fig. 2, whereby the driving disk 8 will frictionally engage the driven disk 9 to rotate the same when the motor M is running. This governor includes a generally annular casting 31 which is splined to the shaft as indicated at 32 so that it will rotate therewith but the shaft will be free to move longitudinally relative to the governor. This casting supports L-shaped levers 33 pivoted at 34 on diametrically opposed portions thereof. The outer ends of the long arms of the levers are enlarged or provided with weights 35 while the short arms 36 thereof abut the collar 37 fixed on shaft 24. By this construction it will be seen that as the driving shaft 24 rotates, the governor weights 35 will move outwardly or away from the shaft causing the short arms 36 of the levers 33 to press against the collar 37. Since the casting 31 abuts the thrust bearing 38, disposed between the casting and the bracket arm 23, the shaft will be moved toward the left as viewed in Fig. 2 to hold the driving disk 8 in driving engagement with the friction disk 9 of the driven unit 10.

The driven unit generally designated 10 is bolted or otherwise suitably secured to the end frame 5. This driven unit comprises the gear box 40 having a longitudinally extending shaft 41 supported for rotation therein. As shown in Fig. 1, this shaft is provided with a worm gear 42 which engages the worm wheel 43 supported by the transverse shaft 44 journaled in the gear box. The projecting end of the transverse shaft 44 is provided with a pair of sprocket wheels 45, which, through suitable chains (not shown) supply power to the printer and the drier of a blue print machine, such as illustrated in copending application, Serial No. 124,874.

The longitudinal shaft 41 also projects beyond the gear box and has secured thereto the friction disk 9 which, as mentioned above, is adapted to be engaged by the driving disk 8 when the motor M is running. This friction disk or wheel includes the plates 46 having a friction ring 47, of leather or the like, clamped therebetween. When the machine is idle, the periphery of the friction ring will be slightly spaced from or just barely in contact with the flat or friction face 28 of the driving disk, thus preventing the creation of flat spots on the friction ring. The projecting end of the shaft 41 may extend adjacent the bracket 48, which is fixed to the gear box 40. This bracket provides a support for one end of a flexible-shaft housing (not shown). A flexible-shaft disposed within the housing may have one end thereof connected to the projecting end of the shaft 41 and the other end thereof connected to a speedometer (not shown) preferably calibrated to indicate the travel of paper in feet per minute, through the blue print machine.

It will be understood that the speed and direction of rotation of the friction disk 9 and its shaft 41 and therefore, the speed and direction of rotation of the sprocket wheels will be governed by the position of the driving disk 8 relative to the driven disk 9. When the driving disk is in the position shown in Fig. 1, that is, with the center thereof adjacent the periphery of the friction or driven disk, the speed of the friction disk will be relatively slow, whereas, when the edge of the driving disk is adjacent the periphery of the friction disk, the speed of that disk will be relatively great. It will be appreciated that the direction of rotation of the driven disk can be controlled by shifting the driving disk 8 so that its center is at one side or the other of the driven disk 9.

In order to adjust the speed and direction of rotation of the driven unit, it is only necessary to tilt the driving unit on the rod 16. To facilitate this adjustment, the gear box 40 is provided with a pair of spaced apertured lugs 50 which rotatably support the rod 51. This rod has pinned thereto, the upwardly extending shift lever 52 which has its upwardly extending free end disposed adjacent the feed table 53 of the printer of the blue print machine, where it will be readily accessible to the operator of the machine. A downwardly extending arm 54 pinned to the other end of the rotatable rod 51 and connected to the driving unit frame at 55 by means of the link 56, transmits the motion of the shift lever to the driving unit. It will be seen that by shifting the lever 50, the entire driving unit 7 swings about the rod 16 to vary the position of the driving disk relative to the driven disk.

A pair of brackets 57 (only one being shown), which may be attached to or integral with the respective end frames of the machine, are disposed below the feed table 53 for supporting a roll of blue print paper or the like. One of these brackets supports means for retaining the shift lever 52 in its adjusted position. This means includes a slotted arm 58, having one end thereof pivoted to the bracket adjacent the transmission 6, which cooperates with a spring pressed bolt 59 to maintain the shift lever 52 in adjusted position. This bolt extends through a hole in the lever 52 and the slot in the arm 58 and is provided with a spring 60 which serves to frictionally clamp the lever to the slotted arm.

As already mentioned, when the machine is idle, that is, when the motor M is not running, the friction disk 9 barely contacts or is out of contact with the driving disk thus avoiding any harmful pressure on the disk 9 which might result in the creation of flat spots on its periphery. However, when the motor is started the governor causes the shaft 24 to move toward the left, as viewed in Fig. 2, so that the driving disk frictionally engages the driven disk to rotate the same. If it is desired to vary the speed or direction of rotation of the sprocket wheels, it is only necessary for the operator to shift the lever in one direction or the other, the spring-pressed bolt 59 and slotted arm 58 maintaining the lever in its adjusted position.

From the foregoing description it will be clear that there has been provided an improved variable-speed transmission which may be readily assembled and applied to a blue print machine frame and which may be readily removed from the machine frame for adjustment, repair or replacement of parts since the driving unit and driven unit are self-contained. It will also be clear that since the driving unit is pivotally supported, only a minimum effort on the part of the operator is required to change the speed or direction of rotation of the driven unit.

What I claim is:

1. A transmission comprising a driving shaft, a sheave mounted on said driving shaft, one face of said sheave being flat, a driven shaft supported at substantially right angles to said driving shaft, a driven disk carried by said driven shaft with its periphery adjacent said flat face of the sheave, and a governor mounted on said driving shaft adapted to move said sheave to bring the flat face thereof into driving engagement with said friction wheel when the driving shaft is rotated, said driving shaft being mounted for pivotal movement about an axis spaced therefrom and substantially parallel thereto.

2. A transmission comprising a driving shaft, a sheave mounted on said driving shaft, one face of said sheave being flat, a driven shaft supported at substantially right angles to said driving shaft, a friction wheel carried by said driven shaft with its periphery adjacent said flat face of the sheave, a governor mounted on said driving shaft adapted to move said sheave to bring the flat face thereof into driving engagement with said friction wheel when the driving shaft is rotated, said driving shaft being mounted for pivotal movement about an axis spaced therefrom and substantialy parallel thereto whereby the speed of the driven shaft may be controlled.

3. A transmission comprising a frame mounted for pivotal adjustment about an axis, a motor including a motor shaft mounted on said frame, a driving shaft mounted on said frame, means for transmitting the rotation of said motor shaft to said driving shaft, a driving disk fixed to said driving shaft, a driven shaft, a driven disk fixed to said driven shaft in a position to engage said driving disk and to be rotated thereby, and means for swinging said frame about said axis to vary the position of said driving disk relative to said driven disk and thereby vary the speed of said driven shaft.

4. A transmission comprising a frame, a motor having a shaft, mounted on said frame, a driving shaft journaled in said frame, means for transmitting the rotation of said motor shaft to said driving shaft, a driving plate secured to said driving shaft, a driven shaft, a friction disk on said driven shaft engaging said driving plate to be rotated thereby, said frame being mounted for pivotal movement about an axis substantially parallel to said driving shaft, and means for moving said frame about said axis for varying the position of said driving plate relative to said friction disk.

5. A blue print machine having a variable-speed transmission for controlling the speed of operation of the same, said transmission comprising a frame, a motor having a sheave fixed to the shaft thereof, supported on said frame, a driving shaft having a sheave fixed thereto, journaled in said frame, means connecting said sheaves for transmitting the rotation of said motor shaft to said driving shaft, a driving plate fixed to said driving shaft, a driven shaft for operating said blue print machine at selected speeds, a friction wheel fixed to said driven shaft, means for maintaining said driving plate in driving engagement with said friction wheel, said frame being supported for pivotal movement about an axis spaced from said driving shaft, and means for shifting said frame about said axis to vary the position of said driving plate relative to said friction wheel.

6. A transmission comprising a frame mounted for pivotal adjustment about an axis, a motor including a motor shaft mounted on said frame, a driving shaft mounted on said frame, means for transmitting the rotation of said motor shaft to said driving shaft, a driving disk mounted on said driving shaft, a driven shaft, a driven disk fixed to said driven shaft, a governor on said driving shaft operable by the rotation of said driving shaft to move said driving disk into engagement with said driven disk, and means for swinging said frame about said axis to vary the position of said driving disk relative to said driven disk and thereby vary the speed of said driven shaft.

WARREN L. SULLIVAN.